Dec. 8, 1925.  1,564,719
G. W. SPONABLE
LOCK FOR SHIFTING RODS OF CHANGE SPEED GEARING
Filed Oct. 15, 1919  2 Sheets-Sheet 1
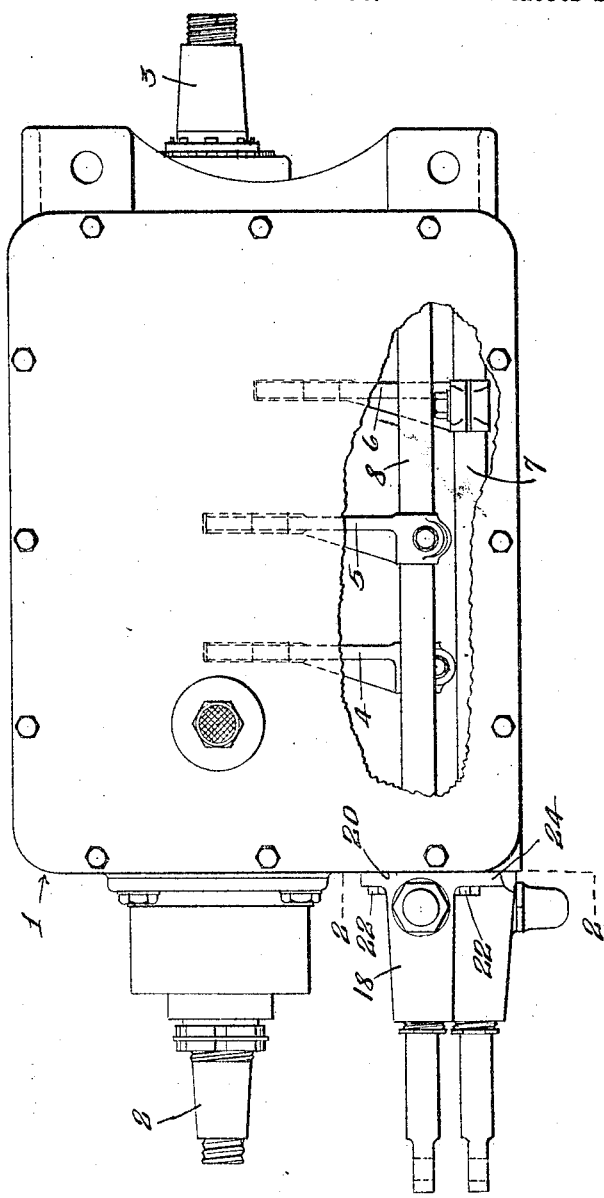
INVENTOR.
George W. Sponable.
BY
Parsons & Bodell
ATTORNEYS.

Dec. 8, 1925.  
G. W. SPONABLE  
1,564,719  
LOCK FOR SHIFTING RODS OF CHANGE SPEED GEARING  
Filed Oct. 15, 1919 2 Sheets-Sheet 2
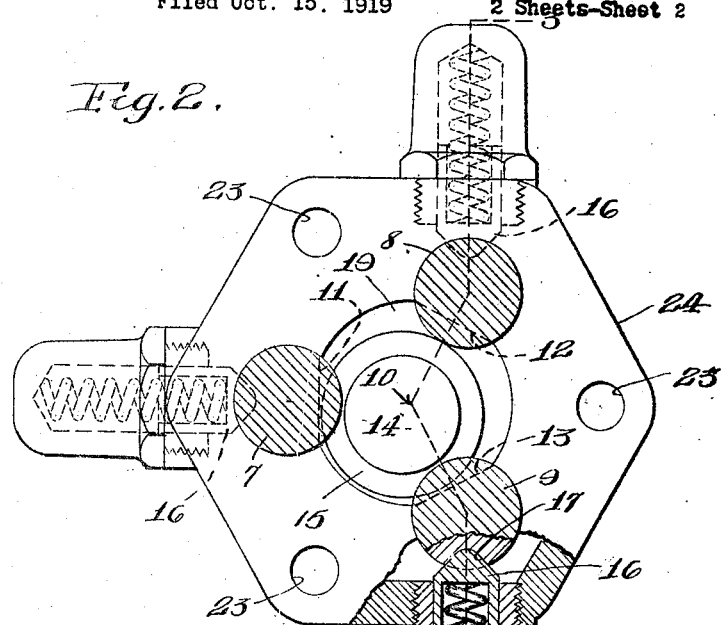
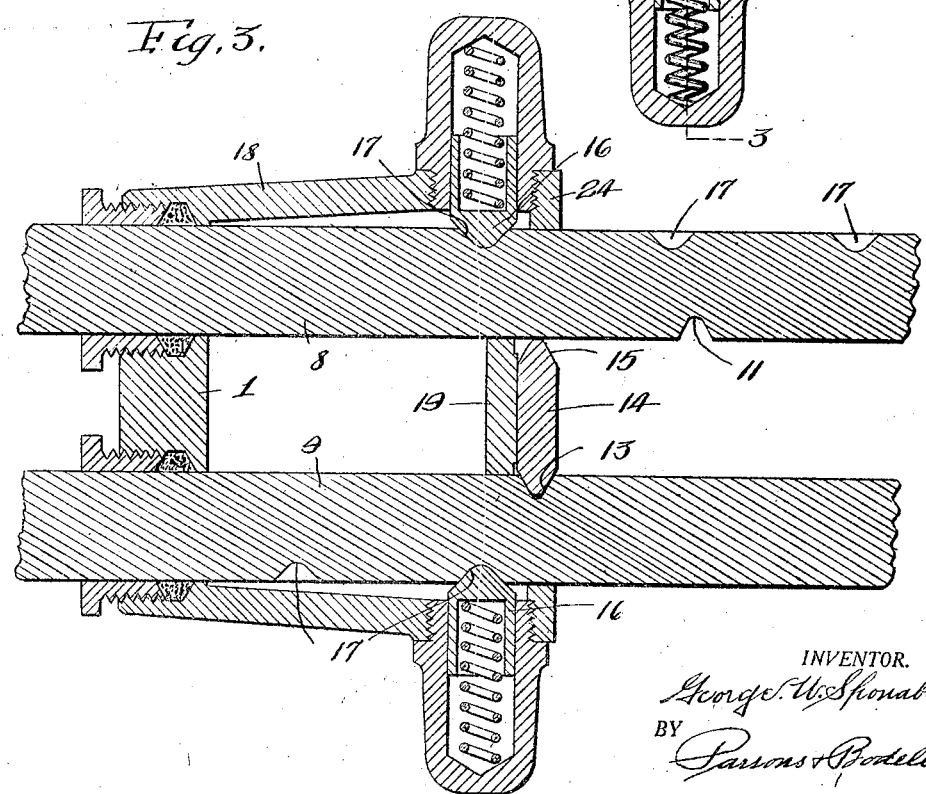
INVENTOR.  
George W. Sponable.  
BY  
Parsons & Bodell  
ATTORNEYS.

Patented Dec. 8, 1925.

1,564,719

UNITED STATES PATENT OFFICE.

GEORGE W. SPONABLE, OF SYRACUSE, NEW YORK, ASSIGNOR TO THE BROWN-LIPE GEAR COMPANY, OF SYRACUSE, NEW YORK, A CORPORATION OF NEW YORK.

LOCK FOR SHIFTING RODS OF CHANGE-SPEED GEARING.

Application filed October 15, 1919. Serial No. 330,849.

*To all whom it may concern:*

Be it known that I, GEORGE W. SPONABLE, a citizen of the United States, and a resident of Syracuse, in the county of Onondaga and State of New York, have invented a certain new and useful Lock for Shifting Rods of Change-Speed Gearing, of which the following is a specification.

This invention relates to change speed transmission gearing such as is used in motor vehicles, and has for its object a particularly simple arrangement of the shifting members or rods and a locking means therefor which is particularly simple in construction and highly efficient and durable in use.

The invention consists in the novel features and in the combinations and constructions hereinafter set forth and claimed.

In describing this invention, reference is had to the accompanying drawings in which like characters designate corresponding parts in all the views.

Figure 1 is a plan view, partly broken away, of a transmission gearing embodying my invention.

Figure 2 is an enlarged sectional view taken on line 2—2, Fig. 1.

Figure 3 is an enlarged view taken on line 3—3, Fig. 2.

This change speed transmission gearing comprises generally, several shifting members, and a lock normally coacting with a plurality and all of said members except one, when said members are in neutral position and movable into coaction with said one of the shifting members upon movement out of neutral position of any one of the other shifting members.

1 designates the casing of a change speed gearing, in which are located driving, driven and counter or jack shafts with gears thereon, some of which gears are shiftable, as will be understood by those skilled in the art.

2 and 3 are the driving and driven shafts.

4, 5 and 6 are shifters or forks coacting with such shiftable gears within the casing and mounted upon the shafts therein.

7, 8 and 9 are the shifting members, as rods by means of which the forks 4, 5 and 6 are actuated, these rods being slidable axially in the casing 1 in any suitable manner. As here shown, these rods are arranged in a series about a center and as there are three of such rods they are arranged radially equidistant from each other and from the center 10 of a triangle formed by lines intersecting the axes of the rods 7, 8, 9.

These rods are formed respectively with notches 11, 12 and 13 on their opposing sides arranged in transverse alinement when the rods are in neutral position, it being understood that in change speed transmission gearing used in motor vehicles, the shifting rods are normally arranged in neutral position in which no gears are engaged and shiftable forwardly and rearwardly from neutral position to shift certain gears into mesh to effect the different speed changes.

The lock normally coacting with a plurality and all of said members or rods except one, and movable into coaction with such one rod when the rods are in neutral position and upon movement out of neutral position of any one of the other shifting members or rods, comprises a floating element as a disk 14 arranged among the several shifting rods near the center 10 and almost wholly within the triangle formed by the lines intersecting the axes of the shifting rods, the disk having its margin tapered as shown at 15 and arranged to enter the notches 11, 12 or 13, of any two of the rods and to be clear of the notch of the third rod to permit the third rod to be shifted.

As shown in Fig. 2, the disk 14 is arranged with its marginal portion 15 in the notches 11 and 13 of the rods 7 and 9 and out of the notch 12, of the rod 8, so that the rod 8 can be shifted and the rods 7 and 9 are positively locked from shifting movement.

When the rod 8 is in neutral position upon shifting of either rod 7 or 9, as for instance the rod 9, the disk 14 will be shifted transversely owing to the beveled faces 15 of its margin and will roll out of the notch 13 of the rod 9 and into the notch 12 of the rod 8, it remaining in the notch 11 of the rod 7. When one of the rods is shifted the periphery thereof holds the disk 14 from shifting out of engagement with the other rods as shown in Fig. 3.

Suitable spring pressed impositive locks or poppets 16 are employed for coacting with the rods and holding them in their shifted positions, these poppets coacting with suitable notches as 17 provided at intervals in the rods.

The poppets and the disk are carried by a casing 18 mounted on the end wall of the main casing 1 and formed with passages or guides through which the rods 7, 8, 9 extend. The disk 14 is located between the end wall 19 of the casing 18 and the opposing outer face of the end wall 20 of the casing 1.

The disk 14 constitutes locking means located between opposing surfaces of the main case and the additional case 18, and movable into and out of engagement with the shifting rods and prevented by said opposing surfaces of the main casing and the additional casing from endwise movement with the shifting rods.

The casing 18 is secured in position in any suitable manner as by screws 22 passing through openings 23 in the base flange 24 provided on a casing 18.

What I claim is:

In a change speed gearing, the combination of a main case, shifting rods supported in the main case and extending through a wall thereof to the outside of same and an additional casing detachably mounted on the outside of the main case and formed with passages for the rods and locking means within the additional casing and coacting with the rods, said locking means being movable between opposing surfaces of the main case and the additional casing into and out of engagement with the shifting rods and being prevented by said surfaces from endwise movement with the shifting rods.

In testimony whereof, I have hereunto signed my name, at Syracuse, in the county of Onondaga, and State of New York, this 11th day of October, 1919.

GEORGE W. SPONABLE.